United States Patent
Bayreuther et al.

(10) Patent No.: US 7,591,216 B2
(45) Date of Patent: Sep. 22, 2009

(54) FLUID POWERED DUAL-PISTON ACTUATOR WITH EFFICIENT FLUID PORTING AND METHOD OF IMPLEMENTATION

(75) Inventors: David Bayreuther, Griswold, CT (US); Leonard Armstrong, Shrewsbury, MA (US)

(73) Assignee: Metso Automation USA Inc., Shrewsbury, MA (US)

( * ) Notice: Subject to any disclaimer, the term of this patent is extended or adjusted under 35 U.S.C. 154(b) by 208 days.

(21) Appl. No.: 11/397,740

(22) Filed: Apr. 5, 2006

(65) Prior Publication Data

US 2007/0234899 A1 Oct. 11, 2007

(51) Int. Cl.
*F01B 9/04* (2006.01)
(52) U.S. Cl. ........................................................ 92/136
(58) Field of Classification Search .................... 92/136
See application file for complete search history.

(56) References Cited

U.S. PATENT DOCUMENTS

| | | | |
|---|---|---|---|
| 1,667,559 A * | 4/1928 | McCaleb | ..................... 92/69 R |
| 2,690,765 A | 10/1954 | Krummel | |
| 4,651,627 A * | 3/1987 | Stewart | ..................... 92/136 |
| 4,838,025 A | 6/1989 | Nelis | |
| 5,024,142 A * | 6/1991 | Vrhel et al. | ..................... 91/271 |
| 5,667,037 A | 9/1997 | Orlitzky | |
| 6,359,403 B1 | 3/2002 | Pollklas et al. | |

* cited by examiner

Primary Examiner—F. Daniel Lopez
(74) Attorney, Agent, or Firm—Oblon, Spivak, McClelland, Maier & Neustadt, P.C.

(57) ABSTRACT

In an actuator, a first piston is attached to a first toothed rack, and a second piston is attached to a second toothed rack. A rotary member is attached to one pinion mating with the first or second toothed racks. A first volume is disposed in the cavity on one side of the first piston. A second volume is disposed in the cavity on another side of the first piston. A third volume is disposed on a side of the second piston opposite the second volume. A first fluid port is in fluid communication with the first volume via a primary fluid passage. A second fluid port, which is external to the cavity, is in fluid communication with the second volume. A fluid passage in the housing, external to the cavity and separate from the primary fluid passage connects the first and third volumes independently of the primary fluid passage.

17 Claims, 5 Drawing Sheets

FLUID POWERED DUAL-PISTON ACTUATOR WITH EFFICIENT FLUID PORTING AND METHOD OF IMPLEMENTATION

BACKGROUND OF THE INVENTION

1. Field of the Invention

The invention relates to a valve actuator operated via fluid pressure. The invention allows convenient location of ports for supplying pressurized fluid to various sections of the actuator such that two pistons and two racks cooperatively rotate a member used to mechanically actuate a valve. As the supply ports are more conveniently located on the valve actuator, position sensors and pilot valves may themselves be located closer together, thus permitting integration of the position sensors and pilot valves.

2. Description of Related Art

Conventional actuators used for operating valves may use electric motors, electric solenoids, gas pressure or hydraulic pressure to provide a mechanical input to actuate the valve. In the field of fluid pressure operated automatic valves, diaphragms and rotary actuators use pressurized fluid to cause a valve to change state between open and closed positions.

Conventional rotary actuators use either linkages or a rack and pinion arrangement in order to rotate a shaft or other rotatable member. The rotatable member is connected to a different shaft or stem on a valve, typically a ball-valve or butterfly valve. When the rotatable member rotates, the stem on the valve also rotates causing a ball or butterfly inside the valve to move from a fluid-blocking position to a fluid-passing position, or vice versa.

Whether using a linkage arrangement or a rack and pinion configuration, fluid powered actuators use an air cylinder with a piston. The piston moves in response to high or low fluid pressure supplied on either side of the piston.

Some conventional actuators use two air cylinders. In these designs, a piston in one cylinder moves in the opposite direction of the piston in the other cylinder. Thus, the pistons move inward or outward together. The cylinders are offset and, in unison, push or pull racks that rotate a central pinion. In order to simultaneously apply pressure to the outer ends of each cylinder, a tee is plumbed in line with the pressurized fluid supply. The tee connection splits supplied pressurized fluid into two separate streams, one for each of the two cylinders.

In some conventional actuators, a tee is built into the actuator itself as an integral part of the actuator housing. FIGS. 1a and 1b are top views of one such arrangement including a conventional rotary actuator 1 with left and right pistons 5 and 7 enclosed in housing 3. As shown in FIG. 1a, compressed air travels into port 19, located on a lateral side of the housing. The compressed air from port 19 moves pistons 5 and 7 and their corresponding attached racks 13 and 15 apart, thus rotating the rotary member 18 and pinion 17 in a counterclockwise direction. While compressed air enters volume 10 through port 19, air from volume 11 on the right of the piston 7 and the volume 9 on the left of piston 5 flows out port 21, also located on a lateral side of the housing. To make the actuator reverse direction, compressed air is supplied to port 21, and port 19 acts as a vent as shown in FIG. 1b. Thus, by providing an integral tee 23 connecting volumes 9 and 11, no external plumbing to create the tee is needed.

However, as the integral tee 23 requires space within the housing 3, the housing 3 must be made large enough to accommodate the fluid passages that split the pressurized fluid supply and connect each of the cylinders. As actuator housings also require many other types of connections/mounting holes or other features to be built into the housing, especially on the top of the housing, conventional valve actuators must compromise between placement of the integral tee and placement of the other connections/mounting holes required to operate the actuator. The passages forming the integral tees are typically drilled into the housing. Therefore, to reduce complexity of the manufacturing process, the passages integral to the housing are made with as few bends as possible, and placement of the tee internal to the housing without interference with other connections/mounting holes becomes more difficult. Thus, the ports 19 and 21 and their corresponding passages are typically located on a lateral side of the housing.

Position sensors are typically used to monitor the position of the rotary member in the actuator. The preferred location for mounting the position sensors is a surface of the actuator 1 in which the rotary member 18 is mounted. As one end of the rotary member 18 is configured to connect to a stem or shaft from the valve, the surface of the actuator 1 opposite the valve remains available to mount the position sensors. In most orientations of the actuator 1 and valve, this preferred surface is on the top of the actuator, but as the actuator 1 and valve may be differently oriented than as shown in FIGS. 1a and 1b, the surface opposite the valve may not be on "top" of the actuator. The valve position sensors occupy some of the available area on the housing. Thus, in conventional actuators, the ports 19 and 21 must be located on a different side of the actuator than the one on which the valve position sensors are located.

To supply pressurized air or to vent the ports 19 and 21 as needed, pilot valves are often used. The pilot valve is often an electric valve that responds to a signal sent from a computer control such as a programmable logic controller (PLC). For best performance and convenience, the pilot valves may be mounted directly on the actuator 1 near the ports 19 and 21.

To save space, decrease manufacturing cost, and increase convenience to the user, a need exists to integrate the position sensors and the pilot valves used to operate the actuator. However, because of the above-noted space constraints, it has been difficult to locate the pilot valves and position sensors on the same side of the housing. Therefore, integration of the position sensors with the pilot valves has been difficult. Accordingly, a need exists to simplify the way in which pressurized fluid is supplied to the ends of the actuator cylinders so that manufacturers are free to position fluid supply ports on the housing with fewer hindrances. Additionally, a need exists to allow placement of an integrated position sensor/pilot valve combination on the side actuator that is opposite the side at which the valve is attached.

SUMMARY OF THE INVENTION

It is an object of the present invention to overcome one or more of the above-discussed or other disadvantages of conventional actuators.

The present invention can provide a valve actuator including, a housing with a cavity configured to hold a piston. A first piston is attached to a first toothed rack, and a second piston is attached to a second toothed rack. A rotary member, which includes an axis of rotation, is attached to at least one pinion mating with the first toothed rack such that the rotary member rotates in response to movement of either the first piston or second piston. A first volume is disposed in the cavity on a first side of the first piston. A second volume is disposed in the cavity on a second side of the first piston. A third volume is disposed in the cavity on a side of the second piston opposite the second volume. A first fluid port, which is external to the cavity, is in fluid communication with the first volume via a primary fluid passage. A second fluid port, which is external to the cavity, is in fluid communication with the second volume. A secondary fluid passage, which is internal to the housing, is external to the cavity and separate from the primary fluid passage and connected to the first and third volumes so as to provide fluid communication between the first volume and third volume independently of the primary fluid passage.

The present invention can provide a method of actuating a valve actuator that includes supplying pressurized fluid to a first port connected to a first volume located on a first side of a first piston via a first passageway such that the first piston moves inside a housing. Air is evacuated from a second port connected to a second volume. Air is transferred from the first volume to a third volume adjacent a second piston via an intermediate passage connecting the first volume to the third volume independently of the primary passageway and external to the first, second, and third volumes such that the second piston moves. A rotatable member linked via gearing to the first and second piston is rotated.

BRIEF DESCRIPTION OF THE DRAWINGS

A more complete appreciation of the present invention, and many of the attendant advantages thereof, will be readily ascertained and/or obtained as the same becomes better understood by reference to the following detailed description when considered in connection with the accompanying drawings, wherein.

DETAILED DESCRIPTION OF THE INVENTION

Examples of preferred embodiments of the present invention are now described with reference to the drawings, wherein like reference numbers throughout the several views identify like and/or similar elements.

Figure 2:
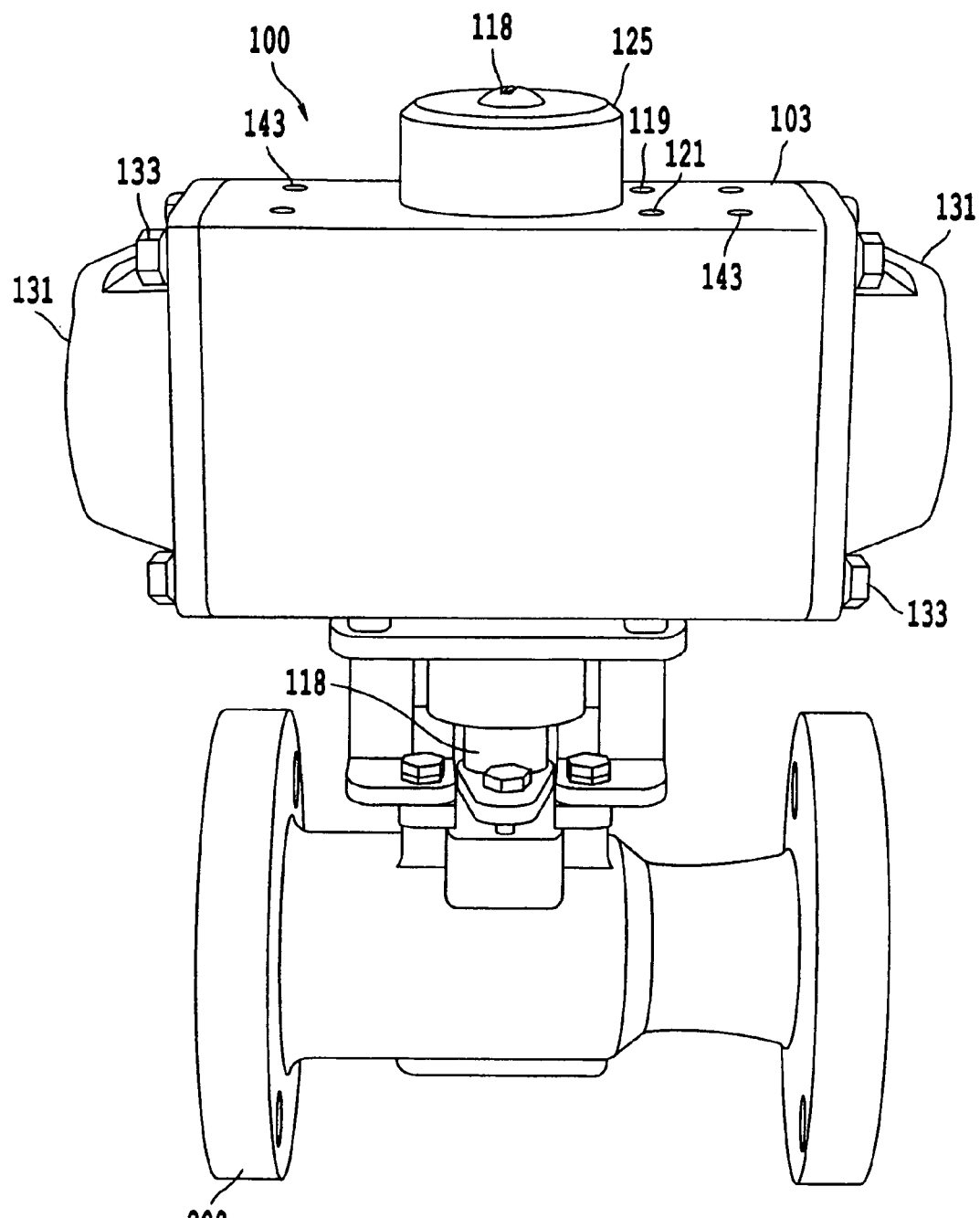
FIG. 2 is a front view of an actuator mounted to a valve according to an embodiment of the present invention.

FIG. 2 shows a front view of an embodiment of an actuator 100 according to the present invention. The actuator 100 is attached to a valve 200. The actuator 100 includes a housing 103 with end caps 131 attached to the housing via end cap bolts 133. A position indicator 125 is attached to the top of the housing 103 in order to monitor the position of a rotary member 118 such as a rotary shaft or coupling. Mounting holes 143 penetrate the surface of the housing 103 and provide a way of mounting external components to the housing 103. For example, the mounting holes may be used to mount a position sensor used to detect the extent to which the rotary member 118 has rotated. In some cases, the rotary member 118 protrudes beyond the face of the housing 103 in the vertical direction. In some cases, the rotary member does not protrude beyond the face of the housing 103, but is merely exposed so that the extent of rotation of the rotary member can be determined. In other cases, the rotary member is exposed only on the bottom of the housing 103 so that a connection may be made to the valve 200.

Figure 3:
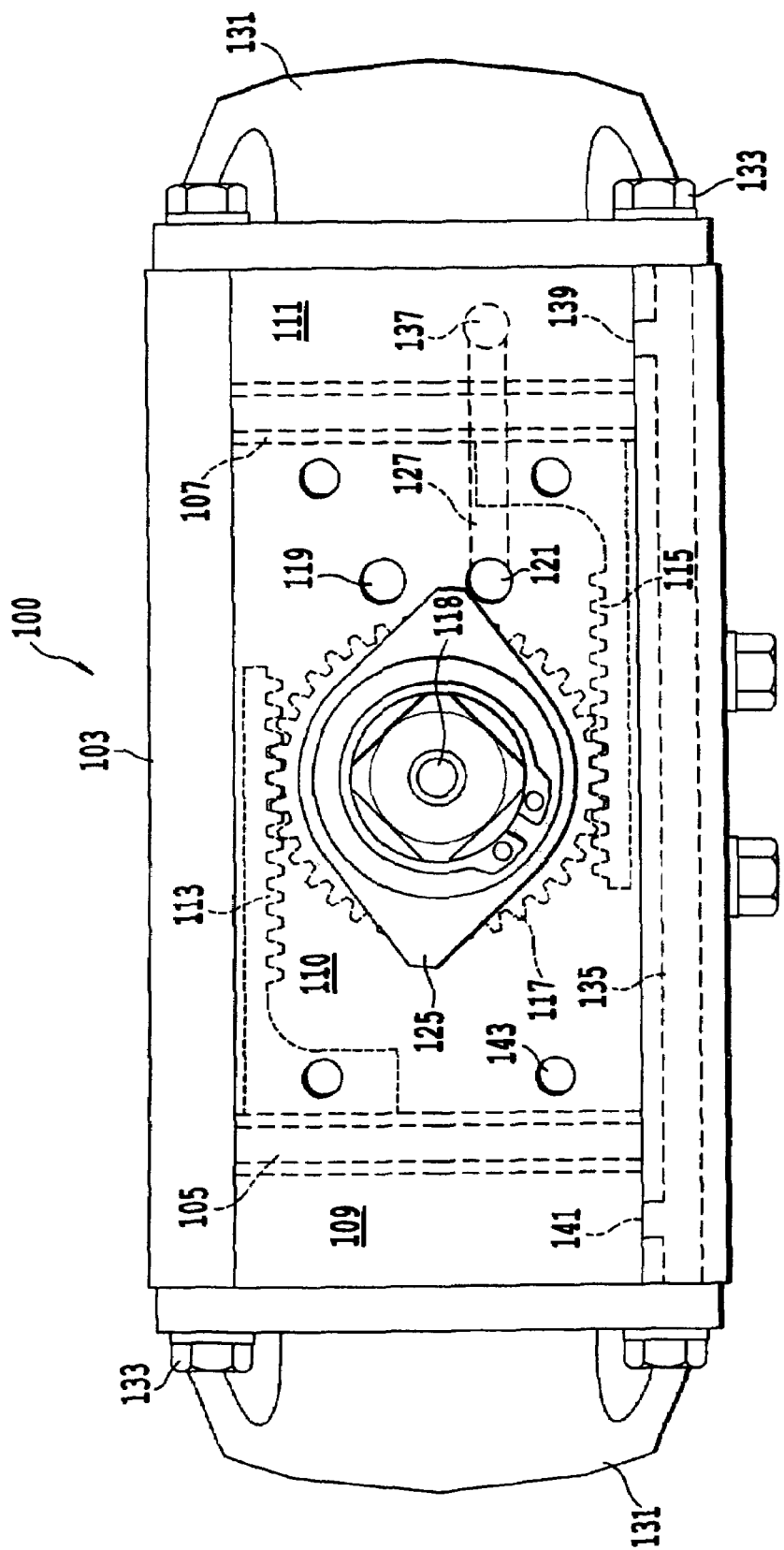
FIG. 3 is a top view of the actuator of FIG. 2.

FIG. 3 shows a top view of the actuator of FIG. 2 with the valve 200 removed. Left piston 105 is connected to left rack 113, and right piston 107 is connected to right rack 115. As the pistons move away from each other, the racks 113 and 115 move apart. As the racks 113 and 115 move outward, the pinion 117 rotates the rotary member 118 in the counterclockwise direction. Conversely, when the left piston 105 and the right piston 117 move toward each other, the pinion 117 rotates the rotary member 118 in the clockwise direction.

The rotary member 118 is connected to a ball, butterfly, or other fluid-blocking device inside the valve 200. As the rotary member 118 turns, so does the fluid-blocking device inside the valve 200. Thus, the valve 200 turns on or off in unison with the movement of the pistons 105 and 107.

Port 119 supplies pressurized fluid to the inner volume 110 to rotate the valve actuator in the counterclockwise direction, and port 121 supplies pressurized fluid to the volumes 109 and 111 to rotate the valve actuator in the counterclockwise direction. Whenever either of ports 119 or 121 is not pressurized, that port acts as a vent allowing fluid inside the cylinders to escape as the piston moves within the cylinder.

The most common type of pressurized fluid used to operate the actuator is compressed air, and the remainder of the description will refer to air rather than fluid. However, the invention may be used with other types of pressurized fluid, such as nitrogen or hydraulic fluid, for example.

As shown in FIG. 3, port 119 penetrates the housing 103 to establish fluid communication with the inner volume 110. Once compressed air flows into the inner volume 110, the pistons 105 and 107 move away from each other and toward the end caps 131.

When compressed air flows into port 119, the pistons 105 and 107 move outward and reduce the size of volumes 109 and 111, respectively. As the size of the volumes 109 decreases, air flows through the port 141 into the intermediate passage 135 and into the volume 111. The volume 111 decreases in size at the same time as the volume 109 decreases in size because the piston 107 moves outward when the piston 105 moves outward. Accordingly, air from the volume 111 seeks a low pressure area and flows through the port 137, into the primary passage 127, and out the port 121.

Figure 1A:
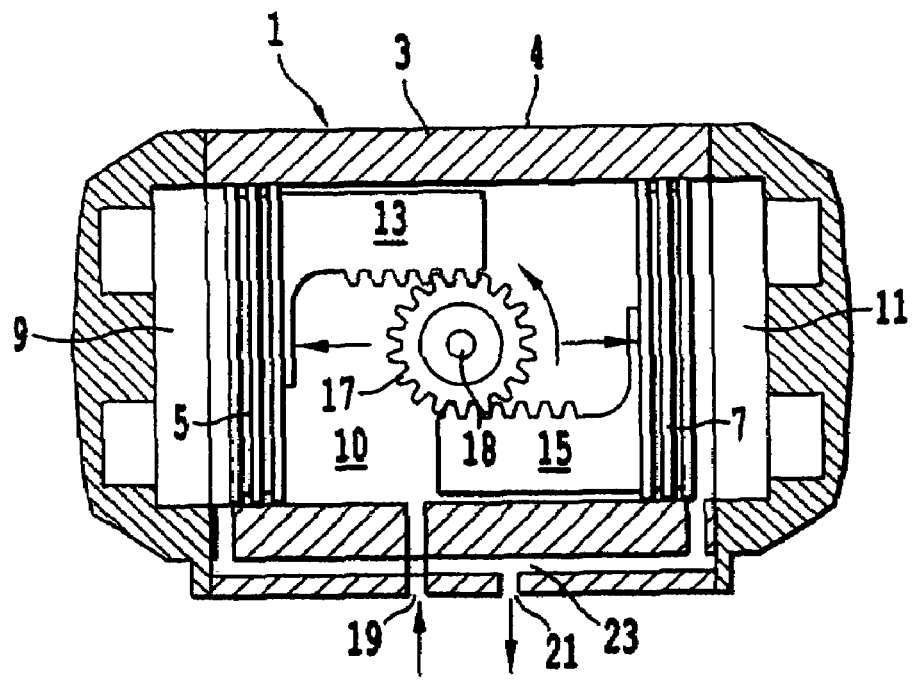
FIGS. 1a and 1b are top views of a conventional double-acting actuator.
Figure 1B:
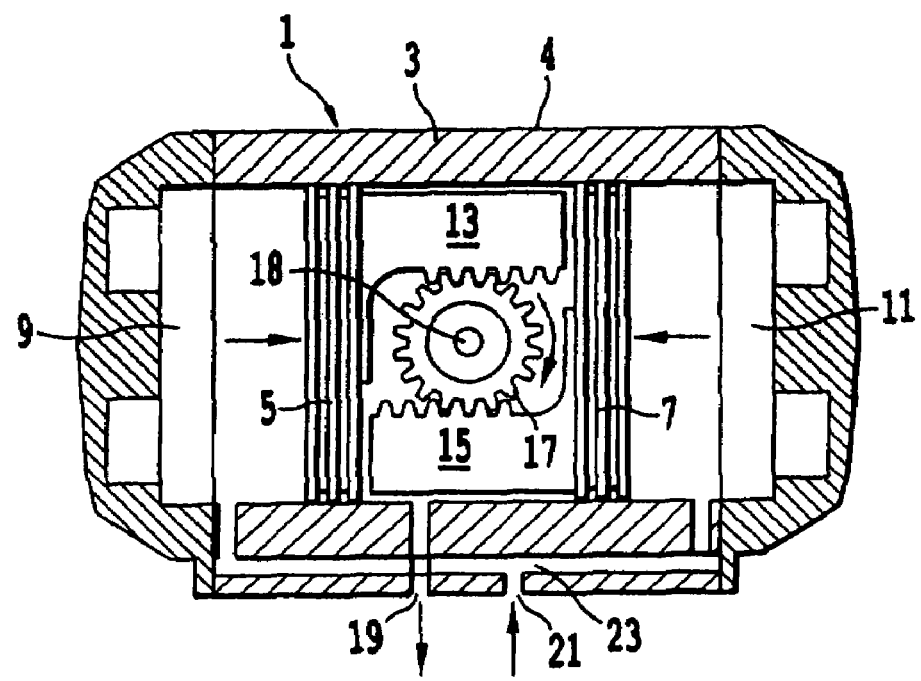

In the arrangement described above, no tee such as tee 123 shown in FIGS. 1a and 1b is necessary. By eliminating the tee 123, the ports 119 and 121 may reside in the same surface of the housing 103 as does the position indicator 125 or in which one end of the rotary member 118 is located. Thus, the ports 119 and 121 may be in close proximity to the position indicator 125 or rotary member 118. Therefore, position sensors (not shown) used to monitor valve status and pilot valves (not shown) used to control flow of compressed air to and from the ports 119 and 121 may be integrated with each other into a single, compact, easily replaceable package.

Figure 4:
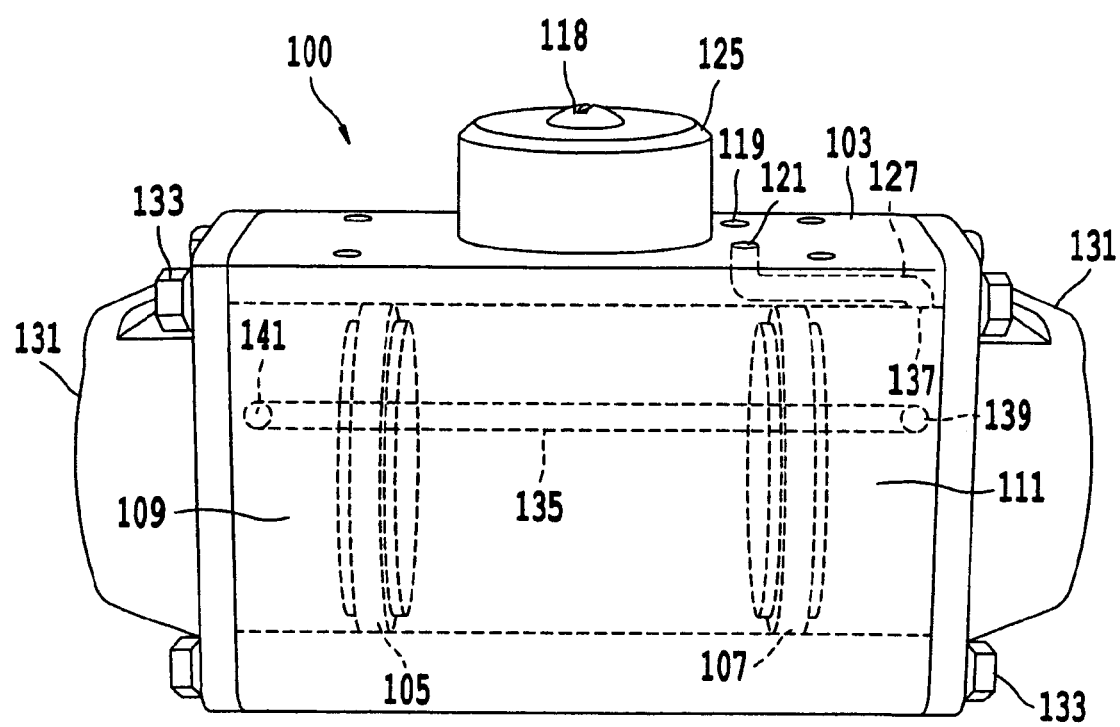
FIG. 4 is a front view of the actuator of FIG. 2 showing internal passages.

As shown in FIGS. 3 and 4, the port 141 is typically positioned in a wall of the volume 109. For example, the port 141 may be drilled in a direction perpendicular to the direction of movement of the piston 105. The port 141 will then connect in fluid communication to intermediate passage 135. One benefit of this arrangement is that the port 141 is located in the housing 103, which may be formed of a single element, rather than in the piston 105 or end cap 131. Therefore, no o-rings or other sealing devices are necessary to connect the port 141 to the intermediate passage 135.

Similar to port 141, port 139 is typically positioned in a wall of the volume 111 parallel to the direction of movement of piston 107, and no o-rings or sealing devices are necessary to connect the port 139 to the intermediate passage 135. Thus, port 141 and port 139 are in fluid communication with each other via intermediate passage 135 in a reliable, simple manner. Additionally, the port 141 and port 139, and therefore the volumes 109 and 111 are in fluid communication independently of the port 121 and the primary passage 127.

Instead of being located in the walls of the volumes 109 and 111 as described above, the ports 141 and 139 may be located in other positions. For example, the left and right ports 141 and 139 could be located in the end caps 131 and connect to the intermediate passage 135 via channels built into the end caps 131. One benefit of this arrangement is that the housing 103 would not need holes drilled in it to connect the ports 139 and 141 with the intermediate passage 135. In such an arrangement, the intermediate passage 135 connects to a machined groove in the end cap 131 to establish fluid communication with the volumes 109 and 111. As grooves are typically easier to fabricate than holes drilled from within a cavity, manufacture of the ports 141 and 139 is easier.

The intermediate passage 135 is located on a side of the housing 103 such that it can extend from an area outside the volume 109 to an area outside the volume 111. Preferably, the intermediate passage 135 is substantially straight such that it can be formed by drilling. By locating the intermediate passage 135 on a different side of the housing than one through which the rotary member is exposed or on which the ports 119 and 121 are located, the intermediate passage has room within the material of the housing 103 to extend from the volume 109 to the volume 111 without bending. Thus, the arrangement described above allows the ports 119 and 121 to be positioned relatively close together and on the same side of the housing 103 as the position indicator 125 or where the rotary member 118 is exposed while permitting the intermediate passage 135 to be made as an integral part of the housing 103.

Accordingly, as the above-described invention allows the ports 119 and 121 to be positioned on the same side of the housing 103 as is one end of the rotary member 118, position sensors to monitor the extent of rotation of the rotary member can be integrated with pilot valves used to control flow of compressed air to the ports 119 and 121. This cannot be provided by conventional actuators.

Figure 5:
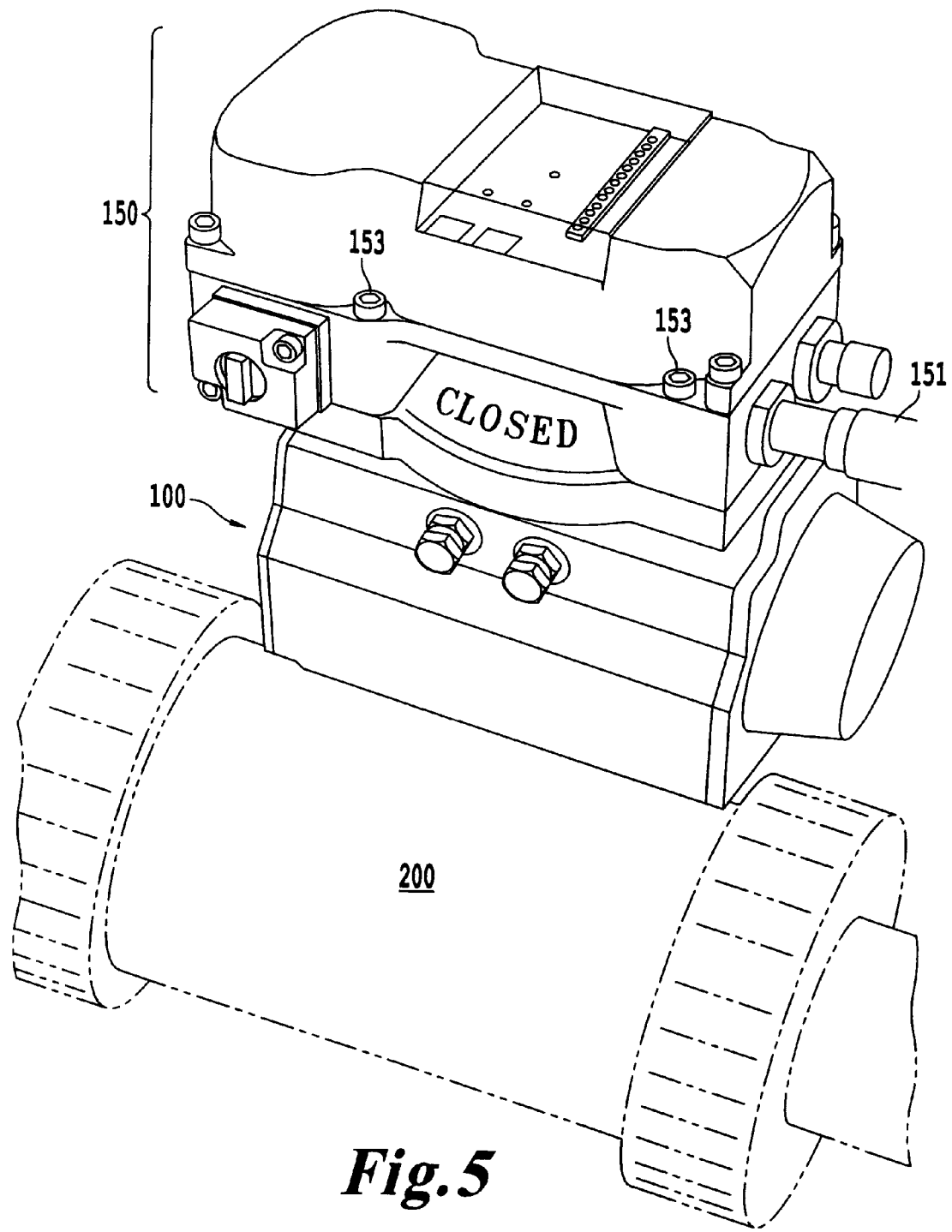
FIG. 5 is a perspective view of the actuator of FIG. 2 with an integrated valve-position sensor/pilot valve assembly attached.

FIG. 5 shows an integrated sensor/valve combination 150 attached to the actuator 100 via cap screws 153. Compressed air flows through the connection 151 and then through either the port 119 or the port 121 as is determined by an internal pilot valve or valves built into integrated sensor/valve combination 150.

As the integrated sensor/valve combination 150 attaches to the actuator 100 via cap screws 153, the ports 119 and 121 are typically sealed to passages internal to the integrated sensor/valve combination 150 via an o-ring or gasket. Thus, there is no need to thread the ports 119 and 121. Alternately, ports can be threaded with either a pipe-thread or a straight thread using an compression seal.

As further shown in FIG. 5, the integrated sensor/valve combination 150 is attached to the actuator 100 on a side of the actuator opposite the side of the actuator at which the valve 200 is attached. As the location of ports 119 and 121 according to the present invention is not limited by the presence of other connections/ports as is the prior art, the ports 119 and 121 may be located in the same relation to the rotary member 118 regardless of the size or shape of the actuator. Accordingly, the same integrated sensor/valve combination 150 may be used with differently sized actuators and valves without changing the way in which the integrated sensor/valve combination 150 is mounted. Thus, the present invention facilitates the integration of valve position sensors and pilot valves into a single module that can be used with a variety of valve actuators. Furthermore, the integrated sensor/valve combination 150 can be mounted on the side (the top as shown in FIG. 2) of the actuator opposite of the side at which the valve is attached. Therefore, the integrated sensor/valve combination 150 is more accessible and easily installed or replaced.

In addition to the configurations discussed above, other embodiments of the invention are possible. For example, instead of directly connecting to the ports 119 and 121, the pilot valve or valves may be plumbed internally in the integrated sensor/valve combination 150 and connect to the ports 119 and 121 through an intermediate connection. In another embodiment, the pilot valve or valves may operate a secondary valve such as an air actuated spool valve. The spool valve will then supply air to the ports 119 and 121 as needed.

Numerous additional modifications and variations of the present invention are possible in light of the above teachings. It is therefore to be understood that within the scope of the appended claims, the present invention may be practiced otherwise than as specifically described herein.

The invention claimed is:

1. A valve actuator comprising:
a housing formed of a single element, the housing including
a cavity, and
a first face including an opening;
a first piston disposed in the cavity and attached to a first toothed rack;
a second piston disposed in the cavity and attached to a second toothed rack;
a rotary member exposed through the opening in the first face and including an axis of rotation and attached to at least one pinion mating with the first toothed rack such that the rotary member rotates in response to movement of the first piston;
a first volume disposed in the cavity on a first side of the first piston;
a second volume disposed in the cavity on a second side of the first piston;
a third volume, disposed in the cavity on a side of the second piston opposite the second volume;
a first fluid port disposed in the first face opposite the second volume as viewed along the axis of rotation of the rotary member and directly exposed to an exterior of the valve actuator so as to be directly accessible for connection to an external first fluid input, external to the cavity, and in fluid communication with the first volume via a primary fluid passage that extends, in a direction of travel of the first piston, from the first fluid port to an area opposite the first volume as viewed along the axis of rotation of the rotary member;
a second fluid port disposed in the first face opposite the second volume as viewed along the axis of rotation of the rotary member and directly exposed to an exterior of the valve actuator so as to be directly accessible for connection to an external second fluid input, external to the cavity, and in fluid communication with the second volume; and
a secondary fluid passage, internal to the housing, external to the cavity and separate from the primary fluid passage, connected to the first and third volumes so as to provide fluid communication between the first volume and third volume independently of the primary fluid passage.

2. The valve actuator of claim 1, wherein the housing comprises:
a second face adjacent the first face;

a third face adjacent the second face and opposite the first face with respect to the housing, the third face including an opening through which the rotary member is exposed; and a fourth face.

3. The valve actuator of claim 1, wherein the first face includes at least one mounting hole.

4. The valve actuator of claim 3, wherein the first fluid port and the second fluid port are not threaded.

5. The valve actuator of claim 4, further comprising at least one automatic air valve mounted to at least one of the first and second fluid ports.

6. The valve actuator of claim 5, wherein the automatic air valve is integrated with a valve position sensor that senses the rotational position of the rotary member.

7. The valve actuator of claim 2, wherein the housing includes fifth and sixth faces and first and second end caps are bolted to the fifth and sixth faces, respectively, via at least one bolt hole located between the first face and the cavity.

8. The valve actuator of claim 1, wherein fluid communication between the first fluid port and the first volume is established via a first internal port connected to the primary fluid passage and located on a side of the first volume, the side being parallel to a direction of movement of the first piston.

9. The valve actuator of claim 8, further comprising:
a second internal port, located on a side of the first volume, the side being parallel to an axis of movement of the first piston; and
a third internal port, located on a side of the third volume, the side being parallel to an axis of movement of the second piston,
wherein the secondary passage connects the second internal port to the third internal port in fluid communication.

10. The valve actuator of claim 9, wherein the secondary passage is located between the cavity and a face of the housing through which the rotary member does not pass.

11. The valve actuator of claim 10, wherein the primary passage is located between the cavity and a face of the housing through which the rotary member passes.

12. A valve actuator comprising:
a housing formed of a single element, the housing including
a cavity, and
a first face including an opening;
a first piston disposed in the cavity and attached to a first toothed rack;
a second piston disposed in the cavity and attached to a second toothed rack;
a rotary member exposed through the opening in the first face and including an axis of rotation and attached to at least one pinion mating with the first toothed rack such that the rotary member rotates in response to movement of the first piston;
a first volume disposed in the cavity on a first side of the first piston;
a second volume disposed in the cavity on a second side of the first piston;
a third volume, disposed in the cavity on a side of the second piston opposite the second volume;
a first fluid port disposed in the first face opposite the second volume as viewed along the axis of rotation of the rotary member and directly exposed to an exterior of the valve actuator so as to be directly accessible for connection to an external first fluid input, external to the cavity, and in fluid communication with the first volume via a primary fluid passage that extends, in a direction of travel of the first piston, from the first fluid port to an area opposite the first volume as viewed along the axis of rotation of the rotary member;
a second fluid port disposed in the first face opposite the second volume as viewed along the axis of rotation of the rotary member and directly exposed to an exterior of the valve actuator so as to be directly accessible for connection to an external second fluid input, external to the cavity, and in fluid communication with the second volume; and
means for providing fluid communication between the first volume and third volume independently of the primary fluid passage.

13. A method of actuating a valve actuator comprising:
supplying pressurized fluid to a first port, located on a first face of a housing and directly exposed to an exterior of the valve actuator so as to be directly accessible for connection to an external first fluid input, connected to a first volume located on a first side of a first piston via a first passageway such that the first piston moves inside the housing, the first passageway extending in a direction of movement of the first piston to a first internal port in fluid communication with the first volume, and the first port being disposed on the first face opposite the second volume as viewed along the axis of rotation of the rotary member;
evacuating fluid from a second port connected to a second volume and disposed on the first face opposite the second volume as viewed along the axis of rotation of the rotary member and directly exposed to an exterior of the valve actuator so as to be directly accessible for connection to an external second fluid input;
transferring fluid from the first volume to a third volume adjacent a second piston via an intermediate passage connecting the first volume to the third volume independently of the first passageway and external to the first, second, and third volumes such that the second piston moves; and
rotating a rotatable member linked via gearing to the first and second piston, the rotatable member extending out of the first face and a face opposite the first face across the cavity,
wherein the housing is formed of a single element.

14. The method of claim 13, wherein the first internal port is located on a side of the first volume parallel to a direction of travel of the first cylinder.

15. The method of claim 14, wherein the transferring of fluid from the first volume to the third volume includes evacuating air from the first volume through a second internal port located on a side of the first volume parallel to the direction of travel of the first piston.

16. The method of claim 15, wherein the transferring of air from the first volume to the third volume includes supplying air to the third volume through a third internal port located on a side of the third volume parallel to the direction of travel of the second piston.

17. The method of claim 12, wherein the means for providing fluid communication is located in a different side of the housing than the first and second ports.

* * * * *

UNITED STATES PATENT AND TRADEMARK OFFICE
CERTIFICATE OF CORRECTION

| | | |
|---|---|---|
| PATENT NO. | : 7,591,216 B2 | Page 1 of 1 |
| APPLICATION NO. | : 11/397740 | |
| DATED | : September 22, 2009 | |
| INVENTOR(S) | : David Bayreuther et al. | |

It is certified that error appears in the above-identified patent and that said Letters Patent is hereby corrected as shown below:

In the Claims

In Claim 17, column 8, line 60, "The method of claim 12," should read --The valve actuator of claim 12,--.

Signed and Sealed this
Twenty-fifth Day of February, 2014

Michelle K. Lee
*Deputy Director of the United States Patent and Trademark Office*